US006919790B2

(12) United States Patent
Kanazawa

(10) Patent No.: US 6,919,790 B2
(45) Date of Patent: Jul. 19, 2005

(54) CONTROL SYSTEM AND METHOD FOR CONTROLLING SYSTEM

(75) Inventor: Ritsuko Kanazawa, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 264 days.

(21) Appl. No.: 10/417,195

(22) Filed: Apr. 17, 2003

(65) Prior Publication Data

US 2003/0210126 A1 Nov. 13, 2003

(30) Foreign Application Priority Data

Apr. 18, 2002 (JP) ....................................... 2002-115604

(51) Int. Cl.[7] ................................................ G06F 7/04

(52) U.S. Cl. ............................... 340/5.21; 340/825.49; 713/202

(58) Field of Search ............................... 340/5.21, 5.61, 340/5.8, 7.29, 3.7, 825.22, 825.49, 825.72; 713/200, 201, 202; 235/375; 709/223; 379/102.01, 102.03, 93.01; 455/418, 419, 420, 422.1

(56) References Cited

U.S. PATENT DOCUMENTS 6,563,430 B1 * 5/2003 Kemink et al. ........ 340/825.49
6,820,801 B2 * 11/2004 Kaneko et al. ............. 235/375
6,844,807 B2 * 1/2005 Inoue et al. ................. 340/3.7
6,854,062 B2 * 2/2005 Okamoto .................... 713/200
2002/0180581 A1 12/2002 Kamiwada

FOREIGN PATENT DOCUMENTS

| | | |
|---|---|---|
| JP | A-2000-32153 | 7/1990 |
| JP | A-2001-258077 | 9/2001 |
| JP | A-2001-285962 | 10/2001 |
| JP | A-2001-331394 | 11/2001 |

* cited by examiner

*Primary Examiner*—Michael Horabik
*Assistant Examiner*—William Bangachon
(74) *Attorney, Agent, or Firm*—Mattingly, Stanger, Malur & Brundidge, P.C.

(57) ABSTRACT

A controller has a unit that stores therein a password specified by a user for each home electric appliance connected to a home network; a unit that, when a home-electric-appliance operation-request message is received, determines whether the message entry location is inside or outside the home; a unit that sends a password request message if it is determined as a result of the determination that the message entry location is outside the home; and a unit that, upon receiving a password in response to the request, determines if the received password matches the password of the controlled home electric appliance that is stored. The controller executes the operation of the home electric appliance connected to the home network only when the passwords match, thus preventing an unauthorized user outside the home from operating the home electric appliances at home.

5 Claims, 6 Drawing Sheets

CONTROL SYSTEM AND METHOD FOR CONTROLLING SYSTEM

BACKGROUND OF THE INVENTION

The present invention relates to a home network system composed of home electric appliances, such as an air conditioner, a refrigerator, and a television set, and a controller controlling those units.

Various methods have been proposed for controlling home electric appliances installed in a house, such as a television set, an air conditioner, and a refrigerator, via the Internet or a cellular phone from outside the home. JP-A-2000-32153 discloses a method for remotely controlling home electric appliances via a cellular phone using a telephone line, and JP-A-2001-331394 discloses a system that allows the user to remotely control home electric appliances by sending an instruction from outside the home to the home network controller via the Internet. The problem with those home networks operable from outside the home is that there is a possibility that a third person maliciously operates home electric appliances. To prevent this possibility, the following technologies are disclosed. JP-A-2001-285962 discloses a technology that prevents an unauthentic unit from setting it up as the authentic controller by analyzing messages transferred over a home network to determine if the controller controlling home electric appliances is authentic. JP-A-2001-258077 discloses a technology that allows the user to use the same remote controller at and away from home and encrypts communication data sent from outside the home for ensuring security.

SUMMARY OF THE INVENTION

It is an object of the present invention to provide a control system and a method for preventing an unauthorized user outside the home from operating home electric appliances in the home.

It is another object of the present invention to provide a control system and a method for making operation instruction processing in the home simpler than that from outside the home to reduce the user load.

It is still another object of the present invention to provide a control system and a method for recording materials for use in finding a reason for an unauthorized access to a home network or for a malfunction.

Even if the home network controller is determined to be authentic, it is impossible to prevent an unauthorized operation if an unauthorized user accesses the controller according to the correct access procedure. Another problem is that, because the user operates home electric appliances away from home in limited chances, it is troublesome to carry around with a special remote controller every time the user goes out.

In the system according to the present invention, the controller on the home network sets up passwords for the home electric appliances before the home electric appliances connected to the home network are remotely operated from outside the home. When access is made to a home electric appliance from outside the home to control it, the controller prompts the user to enter the password of the appliance for authentication to prevent an unauthorized access. The controller also has the function to record information log data on communication with the home electric appliances and to edit and display the log data. This function increases the security of the home network system against unauthorized home electric appliance operations.

The present invention provides a control system for use in a home network system wherein home electric appliances installed inside the home and a controller controlling the home electric appliances are connected via a network and wherein the controller has the so-called gateway function that allows the controller to connect to a public line to connect the Internet and the home network in the home. The controller comprises a unit that stores therein a password specified for each home electric appliance connected to the home network; a unit that, when a home-electric-appliance operation-request message is received, determines whether the message entry location is inside or outside the home; a unit that sends a password request message if it is determined as a result of the determination that the message entry location is outside the home; and a unit that, upon receiving a password in response to the request, determines if the received password matches the password of the controlled home electric appliance that is stored. The controller executes the operation of the home electric appliance connected to the home network when the passwords match, thus preventing an unauthorized user outside the home from operating the home electric appliances at home.

When the operation request message is received from a home electric appliance at home or from the remote controller, the controller skips password authentication processing to reduce the load on the user.

The controller further comprises a unit that stores materials for use in finding a reason for an unauthorized access to a home network and for a malfunction. This is implemented by a function that stores a home-electric-appliance operation-request message, as well as the content of the controller operation executed thereafter, into the storage unit in the controller for editing and displaying stored data.

When the user remotely operates a home electric appliance connected to a home network from outside the home, the system according to the present invention prevents uses the well-known password-based authentication to prevent an unauthorized operation and, when the user operates a home electric appliance in the home, eliminates the need for entering a password to reduce the load. The system also saves and classifies the records of access to home electric appliances from inside and outside of the home over the network so that they can be displayed, making it easy to trace and monitor unauthorized accesses.

Other objects, features and advantages of the invention will become apparent from the following description of the embodiments of the invention taken in conjunction with the accompanying drawings.

DETAILED DESCRIPTION OF THE EMBODIMENTS

An embodiment of the present invention will be described below.

Figure 1:
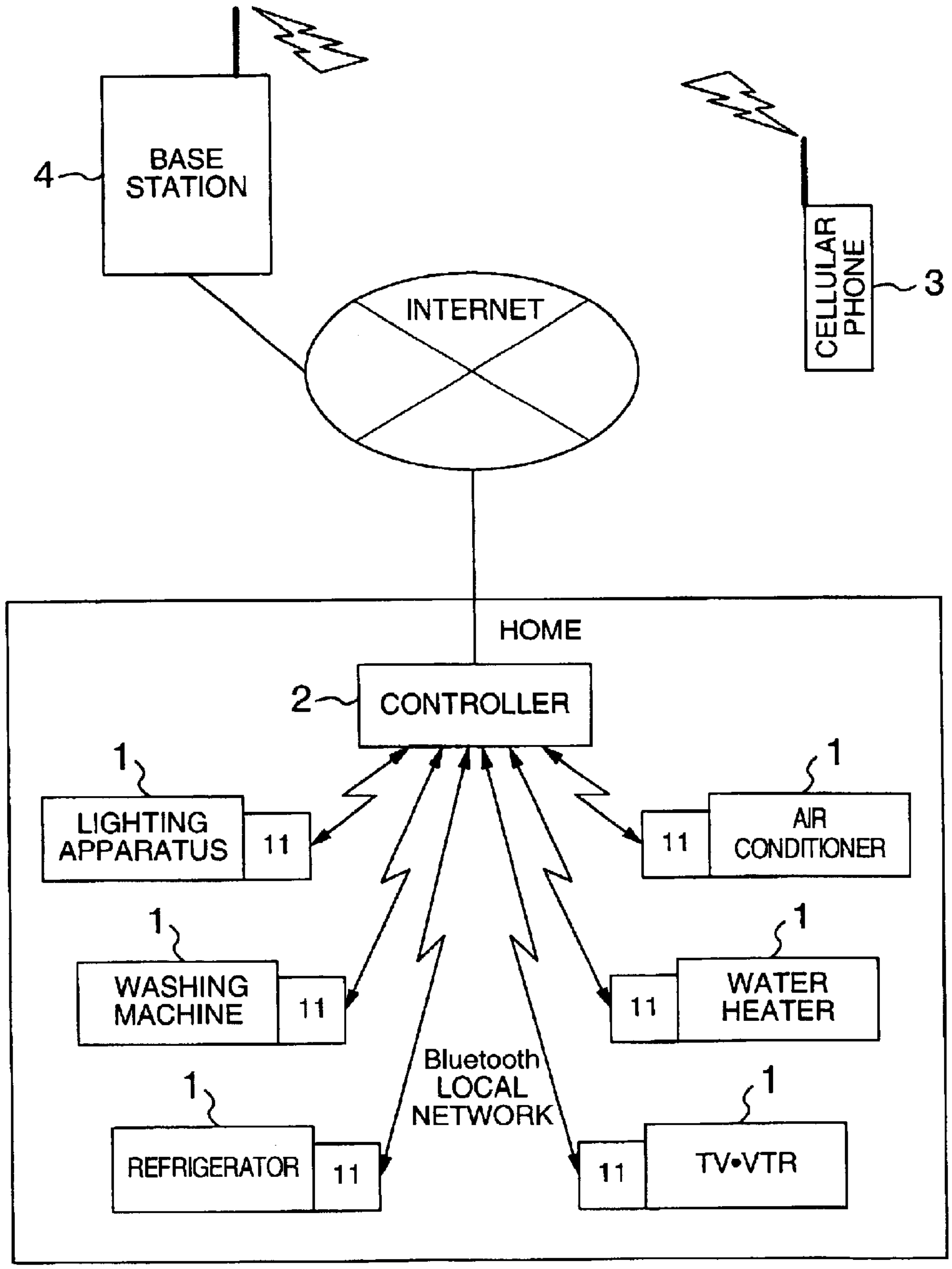
FIG. 1 is a diagram showing the general configuration of a home electric appliance network system in an embodiment of the present invention.

FIG. 1 is a diagram showing the general configuration of a home network system according to the present invention. Home electric appliances 1 installed in the home, such as a refrigerator, an air conditioner, a television set, a lighting apparatus, a water heater, and a common remote controller of those appliances, and a controller 2 send and receive fixed-format message data via a local communication unit 11 installed in each apparatus to form a closed local network composed of home appliances. Although 2.5 G Hz Bluetooth wireless communication is assumed as the communication interface of the local network in this embodiment, any interface configurable in general households such as an infrared IrDA or an electric light line may be used. The controller 2, also connected to the Internet via a public line, communicates also with any Internet terminal outside the home. In this embodiment, it is assumed that the controller 2 has the WWW (World Wide Web) server function and that a cellular phone 3 (mobile Internet terminal) with the WWW browser function is used away from home to access the controller 2 via a base station (Internet service provider) 4 for remotely controlling home electric appliances at home from outside the home. Instead of this method, any method by which communication may be made over the Internet, for example, an Internet mail based operation, is also acceptable.

When a home network is built, local addresses applicable only in the home network are assigned to the home electric appliances 1 and the controller 2. The controller 2 uses those addresses to communicate with the appliances connected to the local network via the local network dedicated protocol to remotely control the home electric appliances. In addition, the controller 2, which communicates with a mobile terminal over the Internet using a public line as described above, has the local address as well as a global address provided by the Internet service provider.

Figure 2:
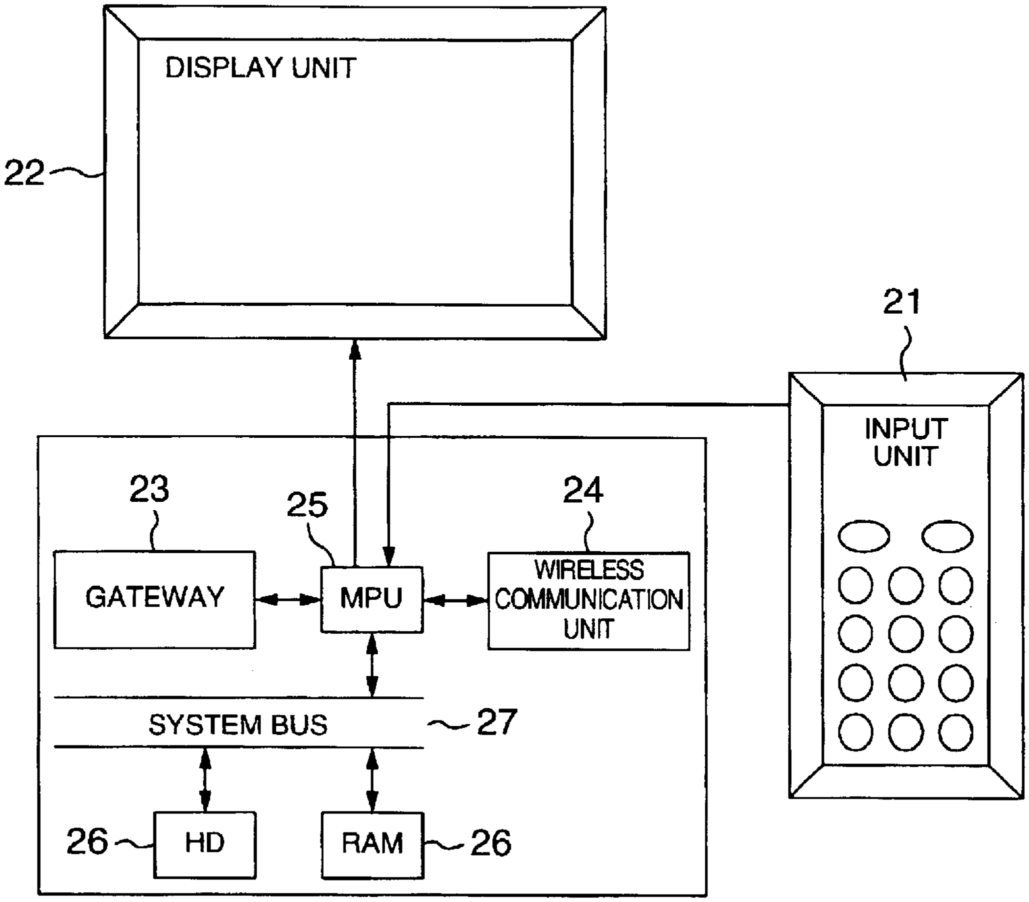
FIG. 2 is a block diagram showing the hardware of a controller used in a system of the present invention.

FIG. 2 is a block diagram showing the configuration of the controller 2. The controller 2 comprises an input unit 21 such as a dedicated remote controller or a console, a display unit 22 on which processing information or data on the home electric appliances is displayed, a gateway 23 that performs TCP/IP (Transmission Control Protocol/Internet Protocol) processing, PPP (Point to Point Protocol) processing or SMTP (Simple Mail Transfer Protocol) or POP3 (Post Office Protocol, Ver. 3) processing for connection to the Internet via a public line such as an ISDN (Integrated Services Digital Network), a wireless communication unit 24 that performs wireless communication with the appliances on the home network, an MPU (Micro Processor Unit) 25 that controls those units, a memory 26 such as a flash memory or a hard disk where programs or data to be processed by the MPU is stored or a RAM (Random Access Memory) used as a program work area, and a system bus 27 through which those components are connected. Although the gateway 23 is responsible for communication with external units via a public line and the wireless communication unit 24 is responsible for home network communication at home in this example, the same communication method may be used inside and outside the home to share the components.

Figure 3:
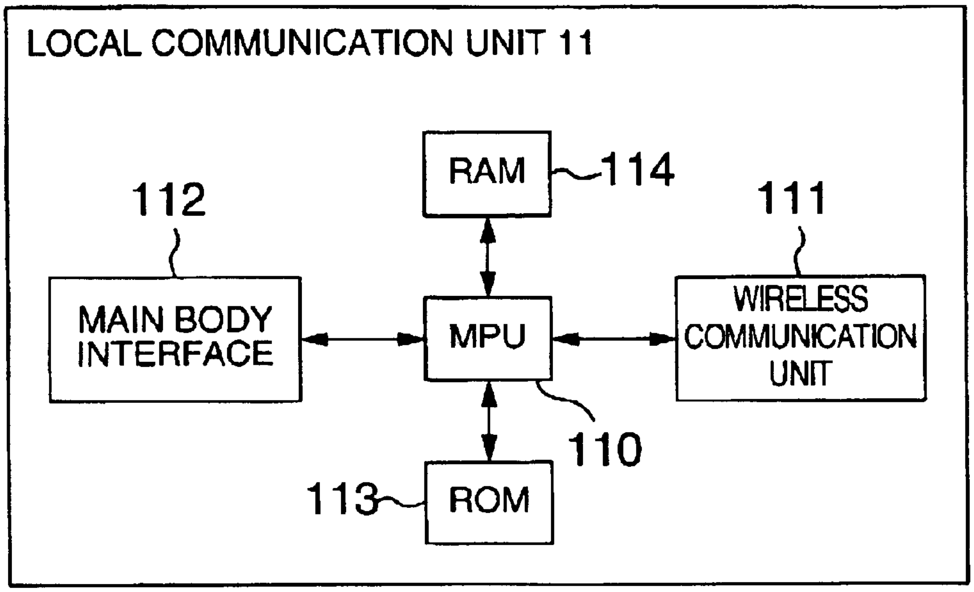
FIG. 3 is a block diagram showing the configuration of the hardware of a home network connection unit in a home electric appliance used in the system of the present invention.

FIG. 3 is a block diagram showing the configuration of the local communication unit 11 installed in each home electric appliance. The local communication unit 11 comprises an MPU 110, a wireless communication unit 111, a main body interface 112, a ROM 113 in which the programs for executing local communication are stored, and a RAM 114 used as a program work area. The wireless communication unit 111, which has a unique address, is connected to the wireless communication unit 24 of the controller via that address for sending or receiving data. The ROM 113 contains a program that converts a message from the controller 2, received via the wireless communication unit 111, into a control instruction to be executed each appliance, sends the instruction to the corresponding appliance via the main body interface 112 to control the appliance, receives the operation result from the appliance via the main body interface 112 in response to the instruction, creates a communication message to be sent to the controller 2, and sends the message to the controller via the wireless communication unit 111. Always keeping the program running implements local network communication in the home between the home electric appliances 1 and the controller 2.

Figure 4:
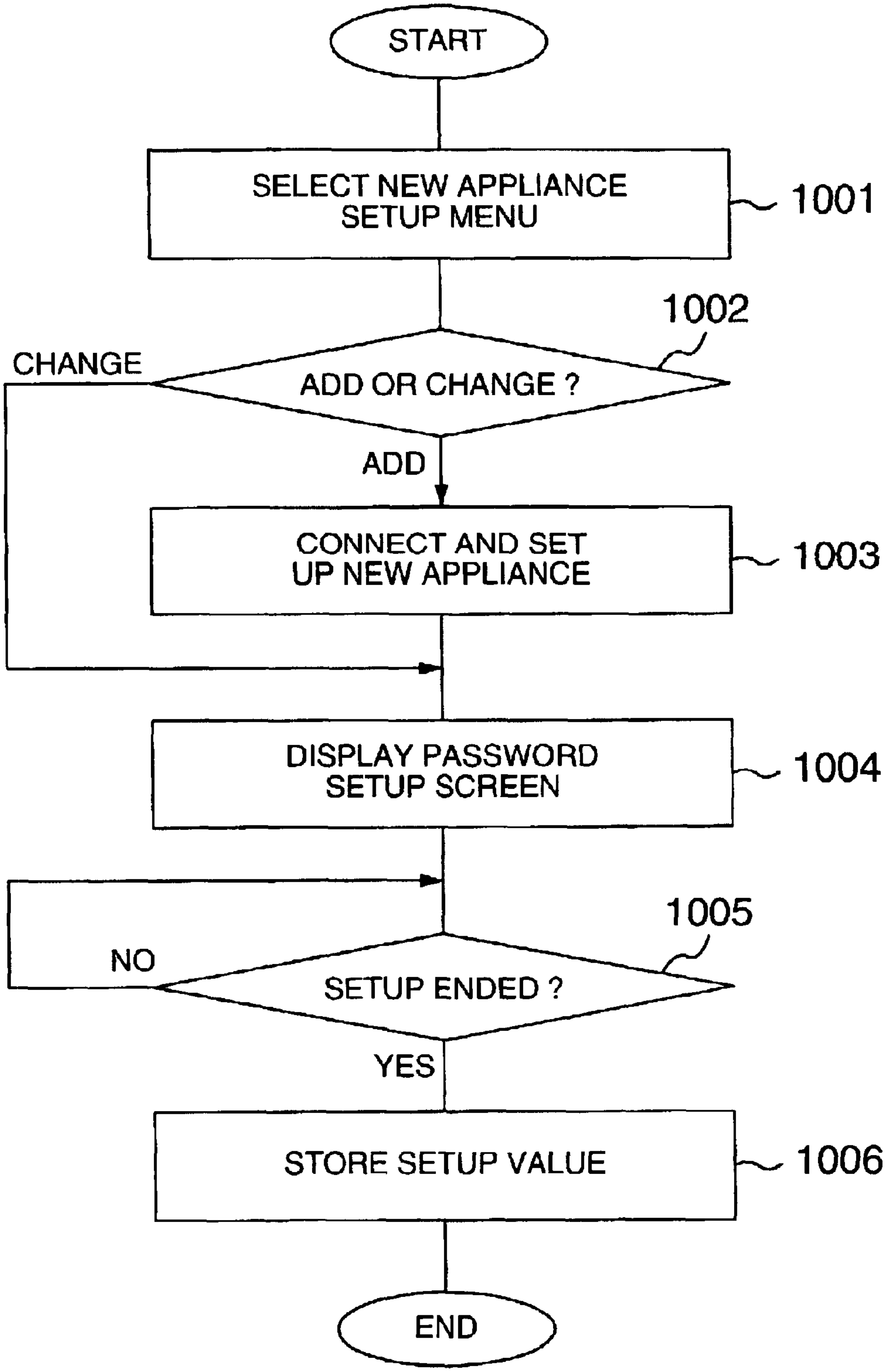
FIG. 4 is a flowchart of a password setting program used in the controller of the present invention.

Next, the operation of the controller 2 will be described with reference to FIGS. 4–6. FIG. 4 is a flowchart of a password setting program stored in the hard disk 26 of the controller 2. First, when a new home electric appliance is connected to the local network in the home, a password is also set in steps 1001–1003. That is, the controller 2 associates a local address in the local network in the home with the unique address of the wireless communication unit 111 of the newly connected appliance to allocate the local address to the appliance. At that time, the controller 2 displays the password entry/change screen on the display unit 22 in step 1004 to prompt the user to enter the password of the newly connected home electric appliance. The password that is set up may be changed any time later. The registration and deletion of an appliance connected to the local network in the home, including password setup/change, may be done only via the input unit 21 of the controller 2. In step 1006, the user-entered password is stored in the hard disk 26 where network connection information on the home electric appliances is stored.

Figure 5:
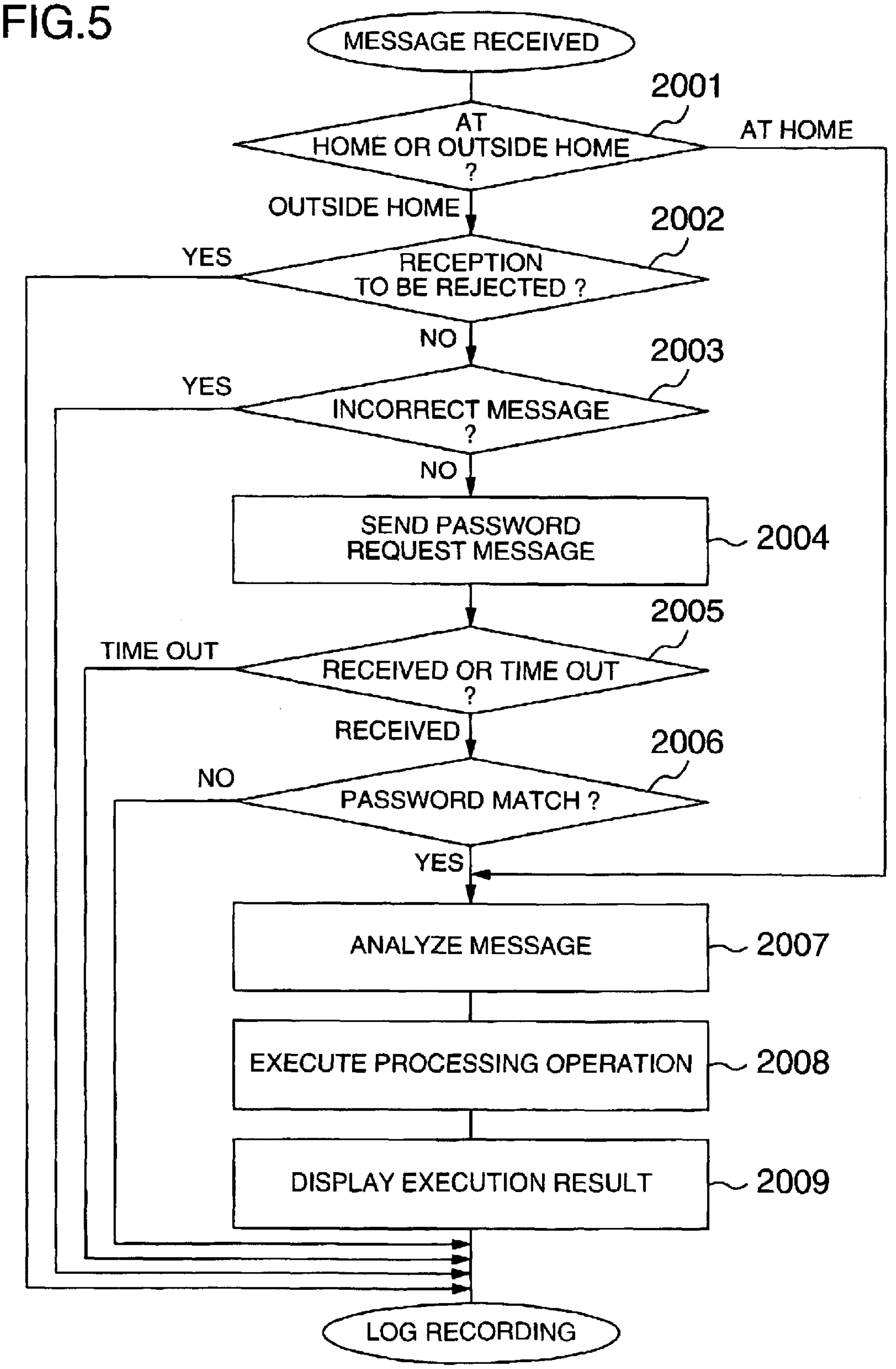
FIG. 5 is a flowchart of a password authentication program used in the controller of the present invention.

FIG. 5 is a flowchart of a program that authenticates a received message using the password set up in FIG. 4. In response to a message, the controller 2 checks in step 2001 whether the message is sent from outside or inside the home. In this checking, the operation is determined to be an operation at home if the source of a received message is an appliance with a local address and the destination is the local address of the controller or if input data was received from the input unit 21 of the controller. If the operation is determined to be an operation performed at home, the controller does not perform user authentication but passes control to step 2007 to analyze the message or the content of operation specified by the input data and, if it is significant, immediately performs requested processing. For example, if the message is a request is received from the common remote controller on the home network to set an air conditioner temperature and to run the it, the controller connects to the local communication unit 11 in the air conditioner via the wireless communication unit 24 and, after a connection is made successfully, sends a control command to the air conditioner. Then, the controller records the message reception time, the home electric appliance from which the message was received, air conditioner operation instruction that is the content of the message, and the time at which the controller sent the operation execution command. If the input data is a request to display the log of past communication and processing, the controller reads log data information from the hard disk and displays it. After performing the processing specified by the message, the controller passes control to the log management program in FIG. 6 to log the controller's operation executed in each processing process from the time the message was received When a message with a global address as the destination is received, the controller 2 determines that the message is a request sent from an outside source and, before performing the processing requested by the message, authenticates the user. First, in step 2002, the controller confirms that the message sender is not a reception-rejected source and, in step 2003, checks if the message conforms to the access format of the home network system. Reception rejection will be described later. If the message content does not conform to the format used in the home network, the controller treats the message as an incorrect message and passes control to the log management program. If the content of the message conforms to the home network format, the controller sends a message to the message sender in step 2004 to request him or her to enter a password. Upon receiving a response to the password request message, the controller extracts the password from the message in step 2006, reads the registered password of the home electric appliance for which an operation is requested by the message, and compares the two passwords. If the passwords match, the controller performs processing as for a request from inside the home and records the processing result as log data. If the passwords do not match or if the received message does not include a password, or if the next message could be received within a predetermined time, the controller passes control to the log management program judging that the message is invalid.

Figure 6:
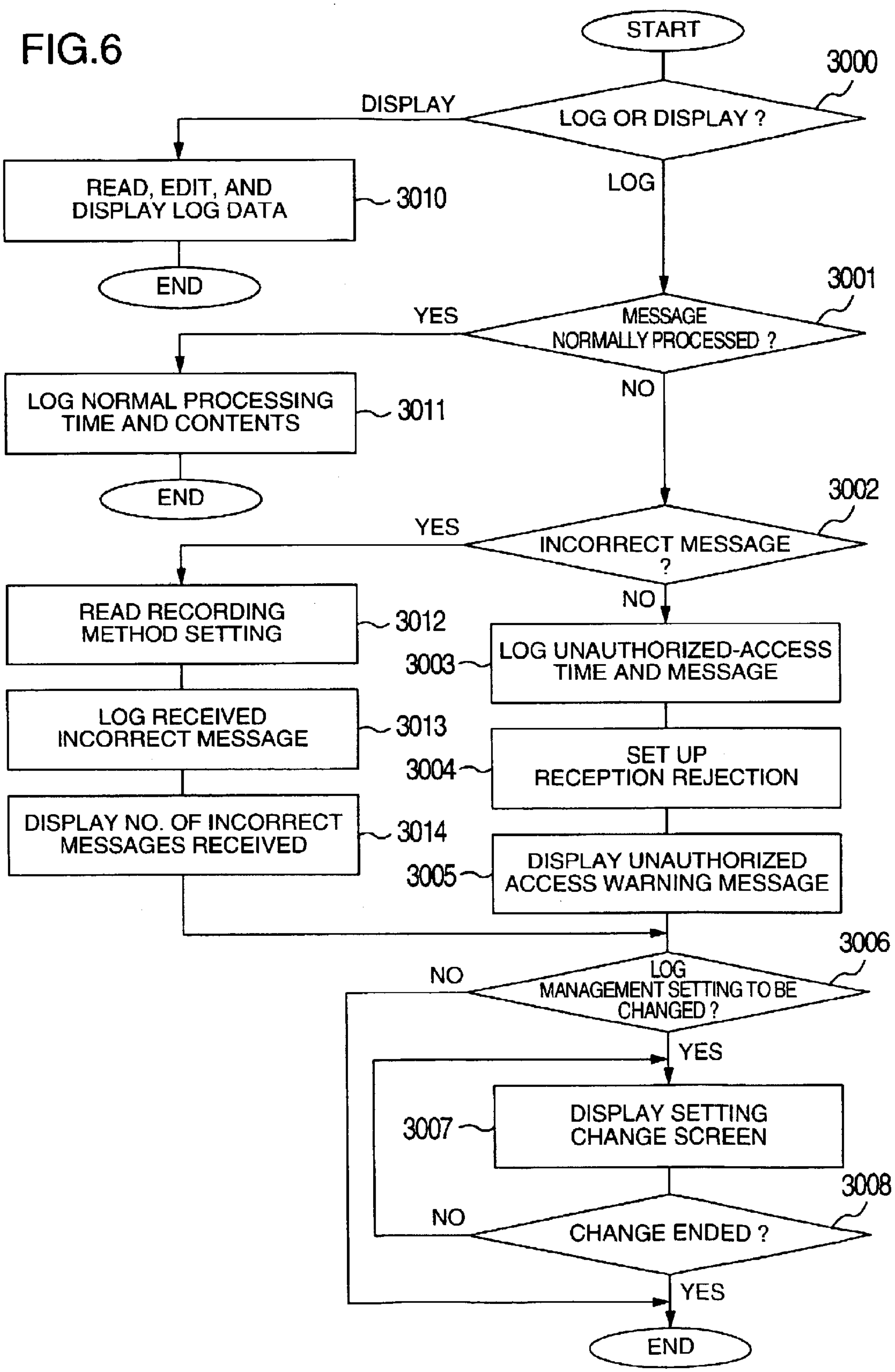
FIG. 6 is a flowchart of the log data management program used in the controller of the present invention.

FIG. 6 is a flowchart of the log management program. When the controller 2 requests the program to log a message, either a message received at home or a message with a matching password from outside the home, after processing it as a significant message, control is passed from step 3001 to step 3011. In that step, the content of processing executed after message reception as well as the time is recorded in the normal log recording area on the hard disk 26 as described above. The amount of data to be saved varies according to the user specification. A list of recorded data may be displayed by entering an instruction from the input unit of the controller 2.

When the requested operation is not the recording of log data on a message that was processed normally, that is, when the message is determined to be incorrect or invalid, the controller records the reception time, message source, message content, and reason for invalidity as log data and, in addition, searches for the past invalid message log data for total calculation. When the message is an incorrect message, the controller records the reception time and the message content in the incorrect message log area on the hard disk 26 according to the user specification in steps 3012 and 3013. For an incorrect message, the user may specify the content to be recorded as log data. The user may specify that the message reception time, content, and all actions taken by the controller 2 on the received message be recorded and saved, that only the reception time and the message source be recorded, or that no data be recorded. When the user does not specify what is to be recorded, the incorrect message reception time and the entire message contents are saved by default. This function is used, for example, when a large amount of advertisement mail is misdelivered although the access is not unauthorized; in such a case, this function is used to skip log data recording to ignore a received message judging that the content of the message need not be saved as log data. When the user specifies that log data be recorded for an incorrect message, the controller finds, in step 3014, the number of times the same message source had sent incorrect messages for total calculation and displays the result.

When a message with a mismatching password or a message determined to be unauthentic because no password was received is received, the controller 2 executes steps 3003–3005 judging that there is a high possibility that an unauthorized access was made. In those steps, the controller saves all received message contents and reception times in the incorrect access area on the hard disk 26. At the same time, the controller sets up the message source as a reception-rejected source and displays incorrect access warning information on the screen. If a message is received thereafter from a reception-rejected source, no processing is performed for the message regardless of its content but only log data is received indicating that the message was received. Messages from a source, which is once determined to be a reception-rejected source, are rejected until a release instruction is entered from the input means of the controller 2.

The user, who views the displayed total number of incorrect messages or incorrect-access warning information, specifies or changes the incorrect message recording method or releases the reception rejection in steps 3006 to 3008 as necessary.

The controller 2 searches and edits log data in various ways according to the user instructions to display, for example, the messages in order or reception and a list of reception times of messages received from a particular source. The information displayed in this way lets the user know who accessed the home network, what access was made, and when access was made.

In the embodiment shown in FIG. 1, the controller 2 is provided separately from the controlled home electric appliances 1 as described above. Instead of this configuration, it is easily understood that a particular home electric appliance may function also as the controller; that is, the system may include a home electric appliance that has the controller 2 in FIG. 2 installed instead of the local communication unit 11 in FIG. 3 to control the home network. In that case, a password must be set up also for the controller.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A control system wherein home electric appliances installed inside a home and a controller controlling the home electric appliances are connected via a local network built inside the home, wherein said controller has a gateway function that allows said controller to connect to a network outside the home to connect the network outside the home to the local network in the home, and wherein the home electric appliances connected to the network system inside the home can be remotely controlled from outside the home via said controller, wherein said controller comprises:

a password setting unit that stores a password specified by a user for each home electric appliance connected to the network in the home;

a source determination unit that, when a home-electric-appliance operation-request message is received over the network, determines whether a source of the message is inside or outside the home;

a password acquisition unit that, if said source determination unit has determined that the source of the message is outside the home, sends a password request message to the source of the message and receives a message, which includes a password, returned in response to the request; and a password authentication unit that determines if the received password matches a password of the home electric appliance that is stored, and wherein said controller executes a control operation of the home electric appliance connected to the network in the home when the passwords match.

2. The control system according to claim 1, wherein said controller further comprises a log storing unit that writes the home-electric-appliance operation-request message that is received and a content of the operation executed by the controller for the received message.

3. A controlling method for use by a controller that controls home electric appliances installed inside a home and that is connected to a local network built inside the home, wherein said controller has a gateway function that allows said controller to connect to a network outside the home to connect the network outside the home to the local network in the home and wherein the home electric appliances connected to the network system inside the home can be remotely controlled from outside the home via said controller, said controlling method comprising the steps, by said controller, of:

storing a password specified by a user for each home electric appliance connected to the network in the home;

when a home-electric-appliance operation-request message is received over the network, determining whether a source of the message is inside or outside the home;

if it is determined, as a result of said step of determining a source, that the source of the message is outside the home, sending a password request message to the source of the message and receiving a message, which includes a password, returned in response to the request; and determining if the received password matches a password of the home electric appliance that is stored, wherein said controller executes a control operation of the home electric appliance connected to the network in the home when the passwords match.

4. A control system wherein appliances and a controller controlling the appliances are connected via a network built inside the home, wherein said controller has a gateway function that allows said controller to connect to a network outside the home to connect the network outside the home to the network in the home, and wherein the appliances connected to the network system inside the home can be remotely controlled from outside the home via said controller, wherein said controller comprises:

a password setting unit that stores a password specified by a user for each appliance connected to the network in the home;

a source determination unit that, when an appliance operation request message is received over the network, determines whether a source of the message is inside or outside the home;

a password acquisition unit that, if said source determination unit has determined that the source of the message is outside the home, sends a password request message to the source of the message and receives a message, which includes a password, returned in response to the request; and a password authentication unit that determines if the received password matches a password of the appliance that is stored, and wherein said controller executes a control operation of the appliance connected to the network in the home when the passwords match.

5. A controlling method for use by a controller that controls appliances and that is connected to a network built inside a home, wherein said controller has a gateway function that allows said controller to connect to a network outside the home to connect the network outside the home to the network in the home and wherein the appliances connected to the network system inside the home can be remotely controlled from outside the home via said controller, said controlling method comprising the steps, by said controller, of:

storing a password specified by a user for each appliance connected to the network in the home;

when an appliance operation request message is received over the network, determining whether a source of the message is inside or outside the home;

if it is determined, as a result of said step of determining a source, that the source of the message is outside the home, sending a password request message to the source of the message and receiving a message, which includes a password, returned in response to the request; and determining if the received password matches a password of the appliance that is stored, wherein said controller executes a control operation of the appliance connected to the network in the home when the passwords match.

* * * * *